US010763774B2

United States Patent
Bernard et al.

(10) Patent No.: US 10,763,774 B2
(45) Date of Patent: Sep. 1, 2020

(54) METHOD AND DEVICE FOR CONTROLLING POLYPHASE SYNCHRONOUS ROTARY ELECTRICAL MACHINE, AND CORRESPONDING REVERSIBLE ELECTRICAL MACHINE FOR MOTOR VEHICLE

(71) Applicant: VALEO EQUIPEMENTS ELECTRIQUES MOTEUR, Creteil (FR)

(72) Inventors: Francois-Xavier Bernard, Creteil (FR); Luc Kobylanski, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 106 days.

(21) Appl. No.: 15/520,740

(22) PCT Filed: Oct. 26, 2015

(86) PCT No.: PCT/FR2015/052875
§ 371 (c)(1),
(2) Date: Apr. 20, 2017

(87) PCT Pub. No.: WO2016/066941
PCT Pub. Date: May 6, 2016

(65) Prior Publication Data
US 2017/0310266 A1    Oct. 26, 2017

(30) Foreign Application Priority Data

Oct. 27, 2014  (FR) ..................................... 14 60298

(51) Int. Cl.
*H02P 1/00* (2006.01)
*H02P 27/08* (2006.01)
(Continued)

(52) U.S. Cl.
CPC ........ *H02P 27/085* (2013.01); *H02P 23/0027* (2013.01); *H02P 25/026* (2013.01); *H02P 25/03* (2016.02)

(58) Field of Classification Search
CPC ............................. H02P 27/085; H02P 25/026
(Continued)

(56) References Cited

U.S. PATENT DOCUMENTS 6,002,219 A    12/1999 Permuy
7,646,178 B1 *  1/2010 Fradella ............... H02K 1/2793
                                                     322/22
(Continued)

FOREIGN PATENT DOCUMENTS

| EP | 2696498 A1 | 2/2014 |
| FR | 2745445 A1 | 8/1997 |
| FR | 2895597 A1 | 6/2007 |

*Primary Examiner* — Eduardo Colon Santana
*Assistant Examiner* — Gabriel Agared
(74) *Attorney, Agent, or Firm* — Berenato & White, LLC

(57) ABSTRACT

The method for controlling a rotating electric machine according to the invention comprises a step of controlling the phase currents of the machine by means of a full-wave control (C). According to the invention, the full-wave control (C) is generated via a pulse width modulated signal of which the signal frequency is greater than an electric frequency of the machine. According to another feature, ascending or descending fronts (24, 25) of the pulse width modulated signal are synchronised with first and second crossings of first and second angular switching thresholds (S1, S2) by an electric position (θ) of the machine and a duty ratio (α) of the pulse width modulated signal is periodically refreshed to the signal frequency.

16 Claims, 5 Drawing Sheets

(51) Int. Cl.
*H02P 23/00* (2016.01)
*H02P 25/03* (2016.01)
*H02P 25/026* (2016.01)

(58) Field of Classification Search
USPC .......................................................... 318/139
See application file for complete search history.

(56) References Cited

U.S. PATENT DOCUMENTS

| | | | |
|---|---|---|---|
| 2005/0001571 A1* | 1/2005 | Benchaib | H02P 29/50 318/432 |
| 2009/0167221 A1* | 7/2009 | Rouis | H02P 6/15 318/400.14 |
| 2009/0302791 A1* | 12/2009 | Bernard | H02P 6/16 318/400.17 |
| 2010/0231145 A1 | 9/2010 | Hobraiche et al. | |
| 2013/0009580 A1* | 1/2013 | De Wergifosse | H02M 7/493 318/400.26 |
| 2014/0176029 A1 | 6/2014 | Nomura et al. | |
| 2014/0306629 A1 | 10/2014 | Nakamura et al. | |

\* cited by examiner

METHOD AND DEVICE FOR CONTROLLING POLYPHASE SYNCHRONOUS ROTARY ELECTRICAL MACHINE, AND CORRESPONDING REVERSIBLE ELECTRICAL MACHINE FOR MOTOR VEHICLE

CROSS-REFERENCE TO RELATED APPLICATIONS AND CLAIM TO PRIORITY

This application is a national stage application of International Application No. PCT/FR2015/052875 filed Oct. 26, 2015, which claims priority to French Patent Application No. 1460298 filed Oct. 27, 2014, the disclosures of which are incorporated herein by reference and to which priority is claimed.

FIELD OF THE INVENTION

The present invention relates to a method and a device for controlling a polyphase synchronous rotary electrical machine.

The invention also relates to a reversible electrical machine for a motor vehicle comprising a device of this type.

BACKGROUND OF THE INVENTION

Considerations of energy-saving and reduction of pollution, in particular in an urban environment, are leading motor vehicle manufacturers to equip their models with an automatic starting/stopping system such as the system known by the term stop and go.

A typical stop and go situation is that of stoppage at a red light. When the vehicle stops at the light, the thermal engine is automatically stopped, then, when the light turns green, the motor is restarted by means of the reversible electrical machine, further to detection by the system that the driver has pressed the clutch pedal, or any other action which indicates the wish of the driver to restart his vehicle.

A three-phase alternator which can function as a starter, i.e. as an electric motor, is described by the company VALEO ELECTRONIQUE in French patent application FR2745445.

A rectifier bridge at the output of the alternator armature also acts as a bridge for control of the phases of the electric motor, with power transistors of the arms of the bridge being controlled by square signal sequences emitted by a control unit.

An "all or nothing" type full-wave control of this type is well known to persons skilled in the art, and is very simple to implement.

In the most recent reversible electrical machines, a polyphase synchronous rotary electrical machine is connected to a reversible direct current-alternating current converter, or inverter, which is supplied by the on-board battery in motor mode and by the electrical machine in generator mode.

The development of digital techniques makes it possible to control the inverter with pulse width modulation, commonly known as PWM, in order to obtain accurate control of the electrical machine in each particular operating condition.

Examples of PWM controls generated by a microprocessor executing programmes are described in the French patent application FR2895597 in the name of the company VALEO EQUIPEMENTS ELECTRIQUES MOTEURS.

However, the inventive body has been faced with the problem of limitation of the switching frequency of the inverters on electrical machines with a large number of poles per phase which rotate quickly.

In fact, the software processing which leads to the development of the duty cycles of the PWM controls requires a signal frequency of the PWM signals which is far higher than an electrical frequency corresponding to the speed of rotation of the machine (typically higher by an order of magnitude).

Because of the limitation of frequency of switching of the inverters, it is difficult to comply with these cycles if there is a large number of pairs of poles per phase (the electrical frequency is equal to the speed of rotation multiplied by the number of pairs of poles per phase).

A solution which is habitually adopted in these circumstances consists of controlling the phases in a conventional manner with full wave, i.e. by generating a square wave form at the electrical frequency of the machine.

This control has variable frequency by nature, since it is synchronous with the speed of the machine, and must be particularly accurate as far as the switching instants are concerned.

If it is wished to remain within a modern system based on a microprocessor executing programmes, and wherein the measurements, processing operations and commands are carried out in a constant cycle time, there is genuine difficulty in obtaining the required waveform whilst being accurate in terms of the switching instants.

In fact, only low temporal resolution is available for the position (since the ratio of calculation frequency to electrical frequency is low), and this does not make it possible to ensure the required precision concerning the form of the control voltage.

SUMMARY OF THE INVENTION

The present invention proposes to use the resolution of a peripheral for generation of pulse width modulated signals which is present in most microprocessors or microcontrollers (programmable ramp generator counter) in order to control the temporal precision of the switching operations.

The invention relates to a method for controlling a polyphase synchronous rotary electrical machine of the type comprising a step of controlling phase currents of this machine by means of a full-wave control.

According to the invention, this full-wave control is generated by means of a pulse width modulated signal with a signal frequency higher than an electrical frequency of the machine.

Rising or descending fronts of the pulse width modulated signal are synchronised with first and second crossings of first and second angular switching thresholds by an electrical position of the machine, according to the invention, and a duty cycle of the pulse width modulated signal is refreshed periodically to this signal frequency.

According to another characteristic of the method of the invention, with the electrical position being evaluated periodically at the signal frequency and a current position of this electrical position being determined at a first instant, a future position of the electrical position at a second instant, consecutive to the first instant, is estimated to be equal to the current position augmented by the quotient of an electrical speed of this machine at the first instant by the signal frequency. The duty cycle is then refreshed to the first instant according to this future position and first and second angular switching thresholds.

According to another characteristic of the method, with the first angular switching threshold being lower than the second angular switching threshold, according to the invention refreshing of the duty cycle at the first instant fulfils one of the following conditions:
the duty cycle is zero when the future position is lower than modulus 360° at the first angular switching threshold;
the duty cycle is equal to a unit when the future position is lower than the second angular switching threshold and the current position is higher than the first angular switching threshold;
the duty cycle α at the first crossing is given by a first expression:

$$\alpha = (\theta(t_{n+1}) - S1) \cdot F / \Omega(t_n)$$

where:
$\theta(t_{n+1})$ is the future position of the electrical position at the second instant;
S1 is the first angular switching threshold;
$\Omega(t_n)$ is the electrical speed at the first instant;
F is the signal frequency;
the duty cycle α at the second crossing is given by a second expression:

$$\alpha = 1 - (\theta(t_{n+1}) - S1) \cdot F / \Omega(t_n)$$

where:
$\theta(t_{n+1})$ is the future position of the electrical position at the second instant;
S2 is the second angular switching threshold;
$\Omega(t_n)$ is the electrical speed at the first instant;
F is the signal frequency.

According to another characteristic of the method of the invention, the pulse width modulation signal is aligned to the right of the first crossing and aligned to the left of the second crossing.

According to a particular embodiment of the method of the invention, the full-wave control is a first control of the "all or nothing" type, or a second control of the "three states" type, the first and second angular switching thresholds being respectively 0° and 180° for the first control, or for example 30° and 150° for the second control.

According to another characteristic, the method of the invention also comprises a step of controlling phase currents directly by the pulse width modulated signal when the electrical frequency is lower than a predetermined nominal electrical frequency.

The invention also relates to a control device of a polyphase synchronous rotary electrical machine which can implement the above-described method.

This device is of the type comprising an electronic control unit which controls an inverter connected to an on-board electrical network which is supplied by a battery, and is designed to be connected to phase windings of the polyphase synchronous rotary electrical machine.

In the device according to the invention, the electronic control unit comprises:
means for acquisition of a position of the rotor or a speed of rotation of the polyphase synchronous rotary electrical machine;
a peripheral for generation of pulse width modulated signals at a predetermined signal frequency comprising at least one programming register of a duty cycle and alignment of the pulse width modulated signal;
means for comparison of the speed of rotation with a predetermined nominal speed of rotation;
a central processing unit which executes a first subroutine or a second subroutine periodically charging the programming register in order to generate pulse width modulated signals to control the inverter, such as to produce first, pulse width modulated phase voltages or second, full-wave phase voltages according to a state of the means for comparison;
means for storage of the first and second subroutines.

According to another characteristic of the device of the invention, the signal frequency is lower than a predetermined maximum switching frequency of the inverter, and the nominal speed of rotation corresponds to a nominal electrical frequency lower by an order of magnitude than the signal frequency.

Advantage will be derived from a reversible electrical machine for a motor vehicle which comprises a control device with the above characteristics.

These few essential specifications will have made apparent to persons skilled in the art the advantages provided by the invention in comparison with the prior art.

The detailed specifications of the invention are given in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

A reversible electrical machine 1 for a motor vehicle is generally a polyphase rotary electrical machine which is supplied by a supply voltage B+ of the on-board electrical network 2 when it is operating as a starter, or which supplies electrical energy to this network 2 when it is operating as an alternator.

A reversible DC/AC converter 3 connected to the stator 4 makes it possible to implement these two operating modes.

Figure 1:
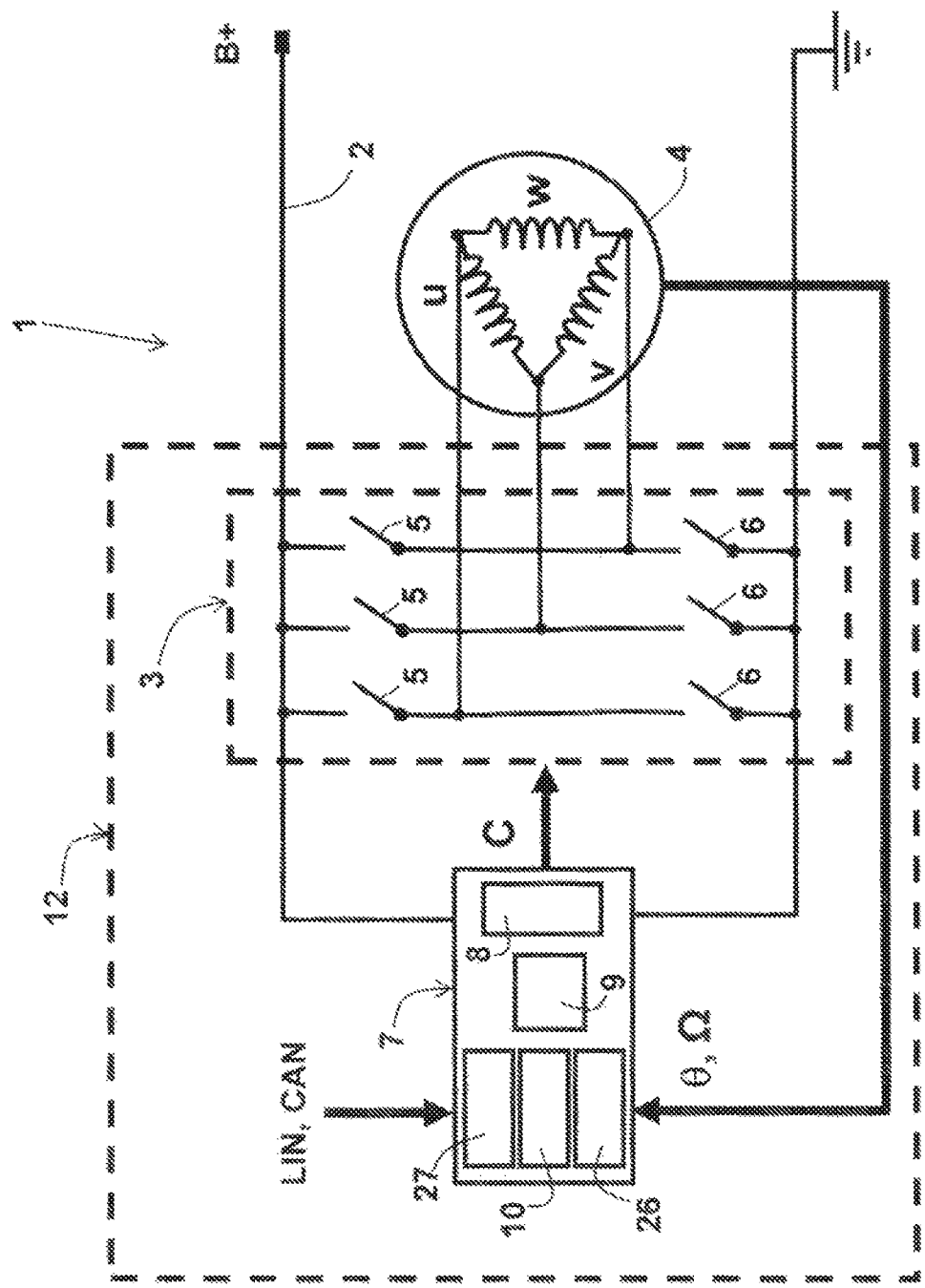
FIG. 1 is a simplified wiring diagram of a reversible electrical machine for a motor vehicle comprising a control device according to the invention.

As represented schematically in FIG. 1 (in the case of a three-phase machine for simplification) the reversible DC/AC converter 3 comprises semiconductor switching elements 5, 6 which are mostly MOSFET technology power transistors organised in a bridge 5, 6.

Each arm comprises a first power transistor 5 which connects a phase winding u, v, w to the supply voltage B+ (so-called "high side" transistor 5) when it is switched on, and a second part transistor 6 which connects this phase winding u, v, w, to a ground (so-called "low side" transistor) when it is switched on.

These switching elements 5, 6 are controlled C by an electronic control unit 7, such that the converter 3 controls operation in alternator mode of the reversible electrical machine, or operation in starter mode or electric motor mode of the machine.

According to the method of the invention, the inverter 3 is controlled C either in full-wave mode, or in pulse width modulation (PWM) mode provided that an electrical frequency of the machine 1 does not lead to use of a signal frequency F which exceeds a maximum switching frequency Fc of the power transistors 5, 6.

In fact, it is considered that the signal frequency F of the PWM control must be equal to approximately ten times the electrical frequency of the electrical machine 1.

Since the electrical frequency is equal to the product of the speed of rotation $\Omega$ (in number of revolutions per second) times the number of pairs of poles per phase p, there is a nominal speed of rotation $\Omega 0$ of approximately Fc/(10p) which must not be exceeded in PWM control, in order for the signal frequency to remain compatible with the performance of the inverter 3.

Figure 2:
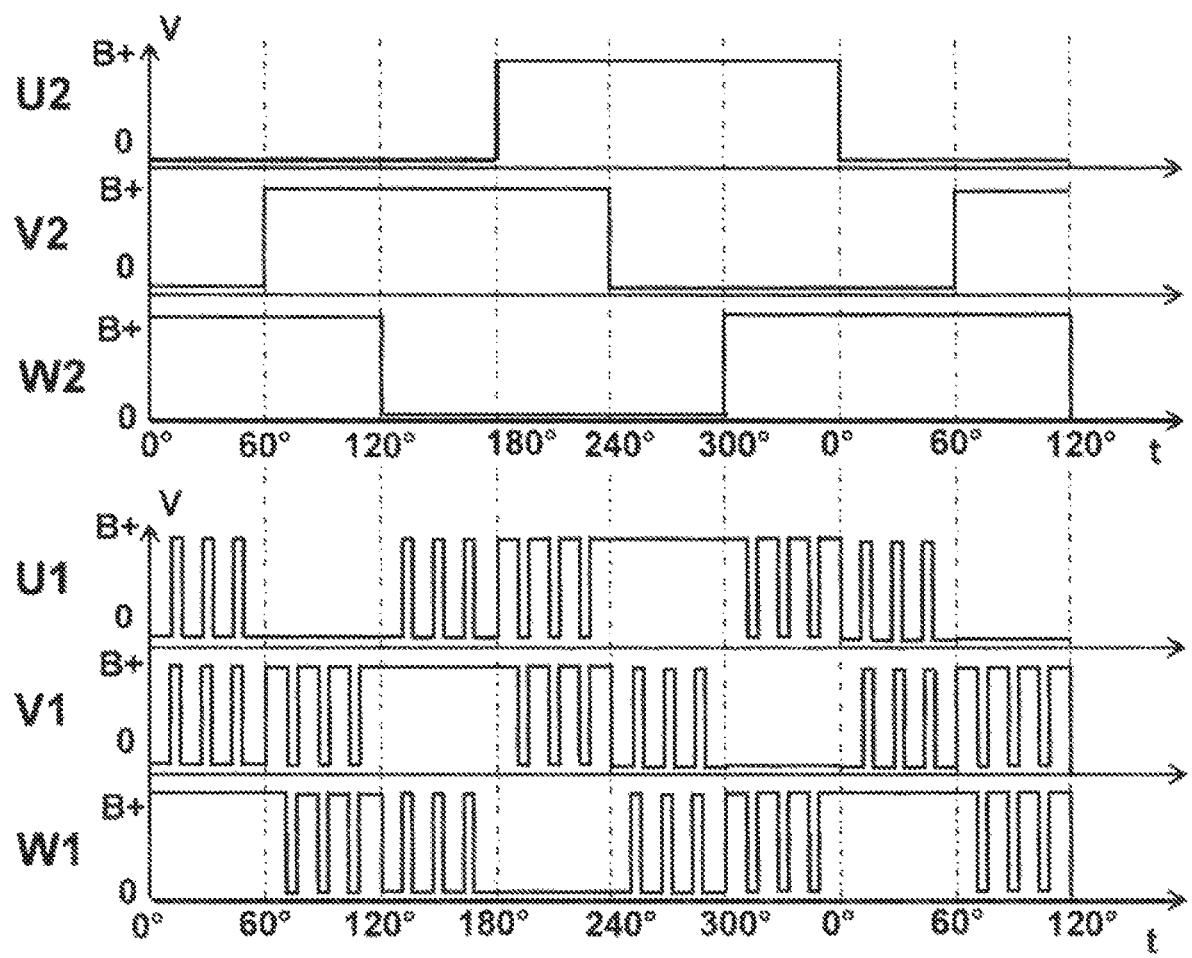
FIG. 2 shows an example of two different time diagrams of phase voltages (full-wave or PWM control) produced by the control device of a reversible electrical machine for a motor vehicle according to the invention.

After the stoppage, for as long as a speed of rotation $\Omega$ is lower than the predetermined nominal speed of rotation $\Omega 0$, the inverter 3 is controlled C with pulse width modulation, but it will be noted that, in other embodiments, it may be desirable to switch sooner into full-wave mode, for example for a reason of energy performance. As shown in FIG. 2, in pulse width modulation, first phase voltages U1, V1, W1 in the form of signals with a variable duty cycle are applied to the phase windings u, v, w of the stator 4.

When the speed of rotation $\Omega$ is higher than this nominal speed of rotation $\Omega 0$, the inverter 3 is controlled C in full-wave mode. Second phase voltages U2, V2, W2 applied to the phase windings u, v, w of the stator 4 have rectangular waveforms offset by 120°, as shown in FIG. 2, in the case of a full-wave control of "all or nothing" type. Since the full-wave control is at the electrical frequency, it remains compatible with the performance of the inverter 3.

Figure 3A:
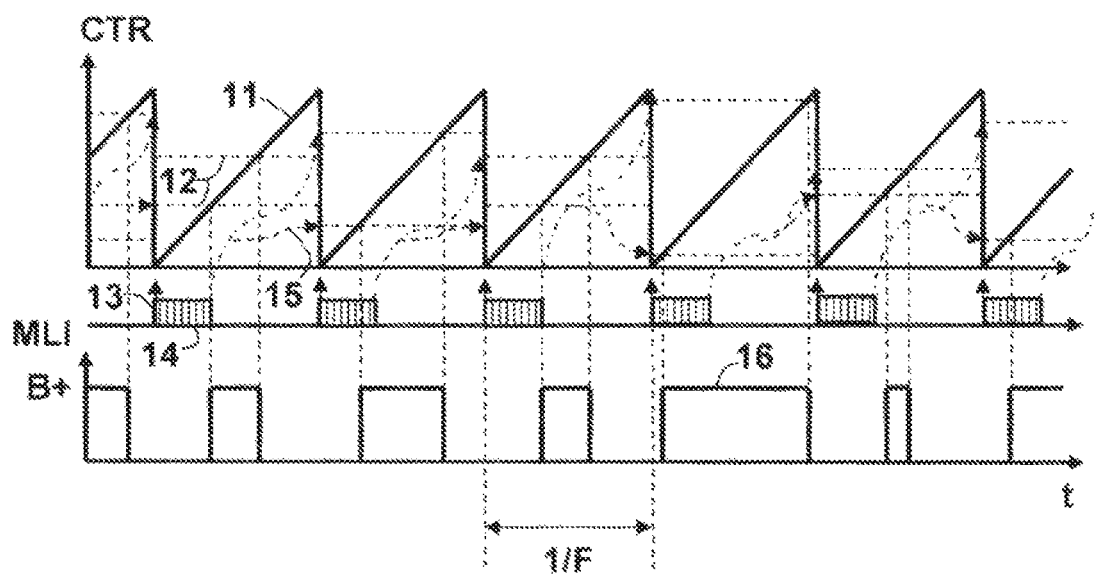
FIGS. 3a and 3b illustrate respectively methods for generation of a PWM control and a full-wave control known in the prior art.

According to a method well known in the prior art illustrated by FIG. 3a, the generation of a PWM signal is based on the electronic control unit 7 formed by a microprocessor or microcontroller comprising a programmable PWM peripheral 8.

A central processing unit 9 of the microprocessor 7 executes a microprogramme stored in a memory 10 consisting substantially of comparing periodic ramps 11 generated by the PWM peripheral 8 by means of a counter CTR at a level 28 of a reference signal, which is generally sinusoidal, corresponding to modulation of the phase currents necessary in order to create a rotary field in the stator 4. Program The ramps 11 are synchronised with dates 13 of acquisition or calculation of an electrical position of a rotor. Data processing 14 carried out at each period 1/F of the ramps 11 permits the periodic refreshment 15 of the duty cycle of the PWM signal 16.

Figure 3B:
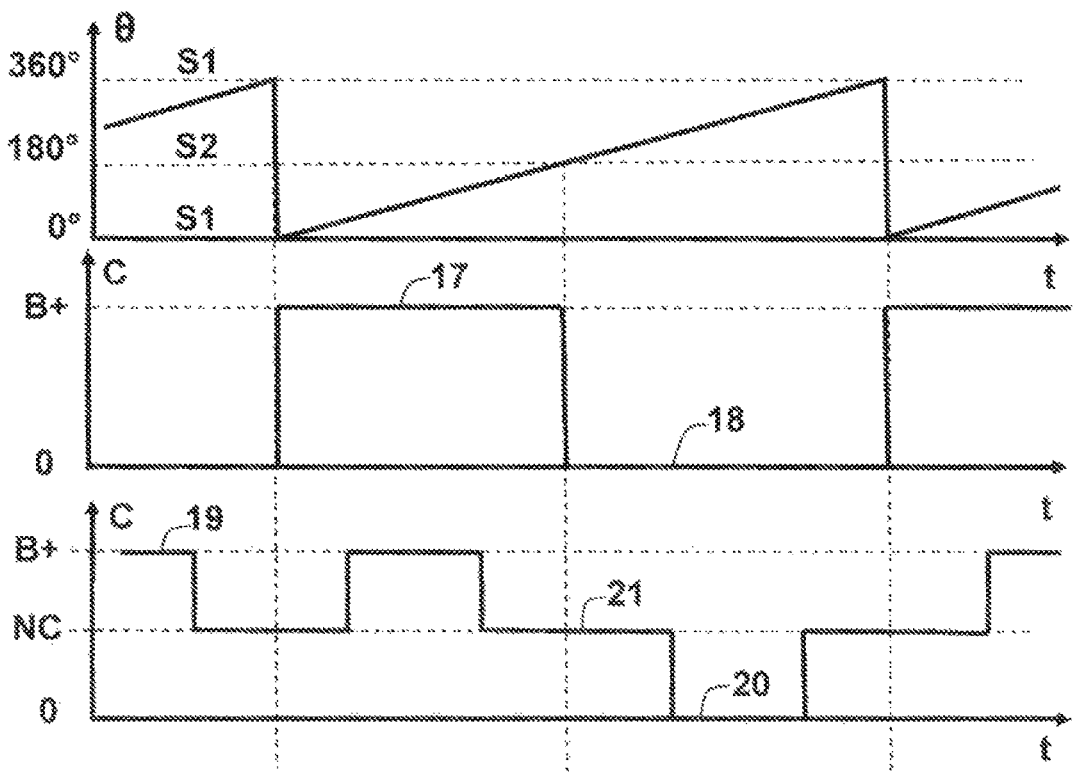

FIG. 3b illustrates a known method for generation of a full-wave control by means of a logic output of a microprocessor 7.

This control is used, even without particular constraint, for reasons of simplicity of control or increased performance.

A first control 17, 18 is known as "all or nothing" or "180°", and controls alternately the "high side" 5 and "low side" 6 transistors of an arm 5, 6 of the inverter 3, in order to connect an end of a phase winding u, v, w either 17 to the supply voltage B+, or 18 to the ground, when the angular position $\theta$ clears a first angular switching threshold S1 equivalent to 0° (modulus 360°), or a second angular switching threshold S2 equivalent to 180°.

A second control 19, 20, 21 is known as "three states", or often "120°" and controls the arm 5, 6 of the inverter 3 according to the angular position $\theta$, such as to put the end of the phase winding u, v, w either 19 to the supply voltage B+, or 20 to the ground, or 21 to leave the phase in the air (free wheel operation).

However, as was stated in the preamble, when a logic output of the microprocessor 7 is used, there is only a low temporal resolution available for the angular position $\theta$ (since the ratio of calculation frequency to electrical frequency is low), and this does not make it possible to ensure the required precision concerning the form of the control voltage.

The method according to the invention is thus based on the use of the resolution of the peripheral for generation of the PWM signals 8 in order to control the temporal precision of the switchings of the control, as will now be explained in association with FIGS. 4a, 4b and 5.

A state machine, produced by an algorithm in the microcontroller 7, calculates the duty cycle $\alpha$ of the PWM signal to be generated in each period T=1/F of calculation. The duty cycle 22, 23 is 0 or 1 when the phase u, v, w does not switch and assumes an intermediate value 24, 25 at the moment of the switchings.

The algorithm controls the point of comparison of the counter CTR generating the ramps 11 of the PWM peripheral 8 by entering a value corresponding to the duty cycle $\alpha$ required in an appropriate register.

The algorithm also controls the position A of the PWM pulse: the PWM signal begins either with the level 1 (this is the alignment to the left 24) or with the level 0 (this is the alignment to the right 25).

The programming of the alignment 24, 25 of the PWM signal depends on the characteristics of the PWM peripheral 8 used, and in particular on the existence of the specific bit(s) (alignment to the right/left, centred) in a dedicated register, but the general principle remains the same.

Figure 4A:
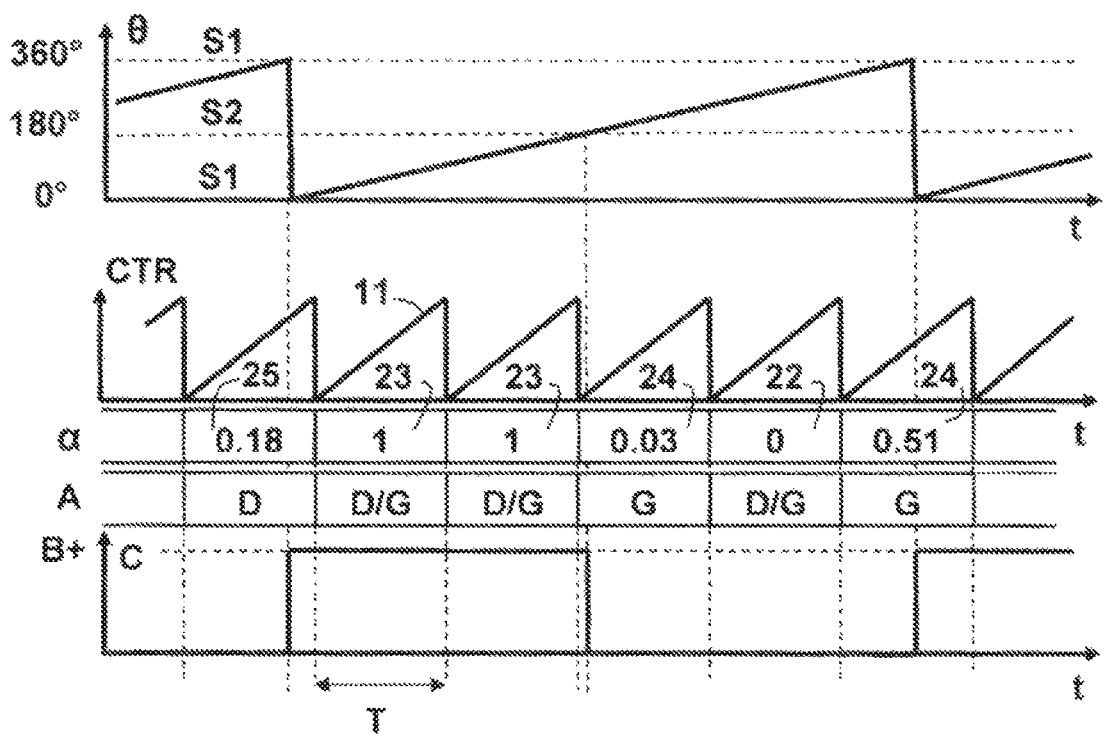
FIGS. 4a and 4b illustrate respectively the generation of a full-wave control of the "all or nothing" type and of the "three states" type according to the method of the invention.

For the full-wave control C of the "all or nothing" type illustrated in FIG. 4a, only the control of the "high side" switching elements 5 of the supply side B+ is generated, the control of the "low side" switching elements 6 of the ground side being complementary, to within the control of the dead time. The moment of the switchings is determined by comparison of the angular position $\theta$ with a first angular switching threshold S1=0°, and a second angular switching threshold S2=180°.

Figure 4B:
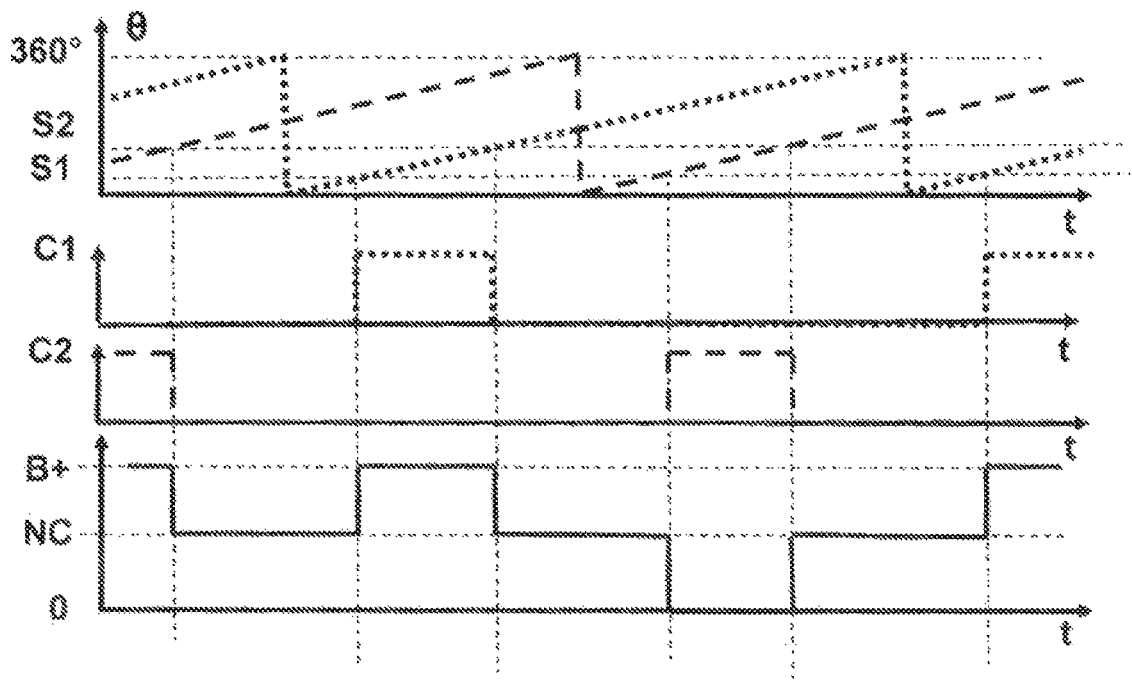

For the control with crossing to high impedance NC illustrated in FIG. 4b, two controls C1, C2 are generated by the microcontroller 7, i.e. one for the "high side" switching elements 5, and the other for the "low side" switching elements 6. The algorithm is duplicated for each of the controls C1, C2 by phase shifting by 180° the electrical position $\theta$ for the "low side" switching elements 6, such as to maintain the same first and second angular switching thresholds S1, S2. These first and second switching thresholds S1, S2 are in the form S1=90°−x/2 and S2=90°+x/2, and the opening of the control is known as x=S2−S1. Typically, for a so-called "120°" control, S1=30° and S2=150°.

Figure 5:
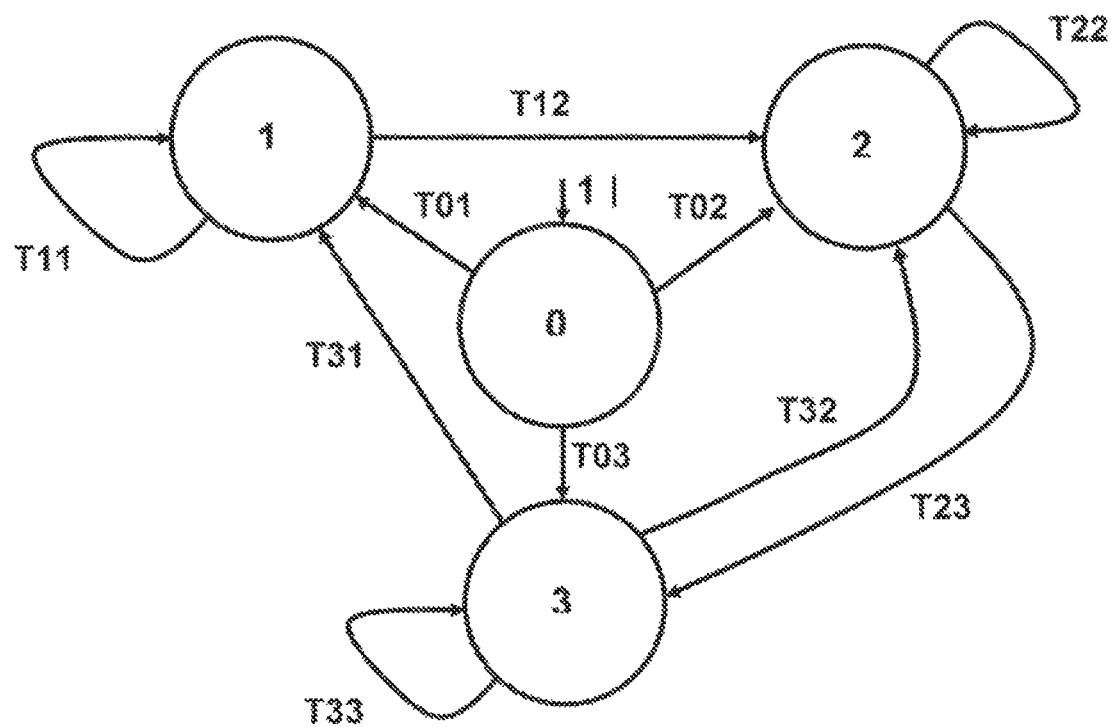
FIG. 5 is a states-transitions diagram specifying the generation of a full-wave control in the control method according to the invention.

For this purpose, the state machine, shown in FIG. 5, needs to know the electrical position $\theta$ at a first instant $t_n$ (present) and at a second instant $t_{n+1}$ (the future) in order to predict the instant of switching and calculate the appropriate duty cycle α. A future position $\theta(t_{n+1})$ is provided by extrapolating from a current position $\theta(t_n)$ and the electrical speed $\omega(t_n)$ at the first instant $t_n$ which is assumed to be unchanged (if applicable a prediction of the future position $\theta(t_{n+1})$ takes into account other factors, such as the acceleration measured or obtained from a mechanical model). The algorithm verifies if one of the first or second angular switching thresholds S1 or S2 is included between the current position $\theta(t_n)$ and the future position $\theta(t_{n+1})$. If this is the case, the duty cycle α is no longer 0 or 1, but a value determined by a fraction of the difference between the current position $\theta(t_n)$ and the future position $\theta(t_{n+1})$.

The positions and angular thresholds θ, S1, S2 are encoded between 0° inclusive and 360° exclusive. The encoding of the angular values θ, S1, S2 uses a whole number such as to benefit from the natural overflow of the whole number in order to provide the layover 0°=360°. The relationship between the future position $\theta(t_{n+1})$ at the second instant $t_{n+1}$ and the current position $\theta(t_n)$ at the first instant $t_n$ is provided by the formula:

$$\theta(t_{n+1}) = \theta(t_n) + \omega(t_n) \cdot T$$

where
$\omega(t_n)$ is the electrical speed of the first instant $t_n$, and T is a calculation period, i.e. the inverse of the signal frequency F of the PWM signal.

The electrical speed ω is always positive. The electrical position θ is typically the integration of the electrical speed ω.

This electrical speed ω is determined from the speed of rotation Ω obtained from a rotor position measurement provided by a sensor of the electrical machine 1, and acquired by the acquisition means 26 of the microprocessor 7, or, for machines without a sensor, by analysis of the phase voltages.

The states machine which permits emulation of a full-wave control C on the PWM peripheral 8 of the processor 9 comprises four states, one of which is an initialisation state (state 0). The states (0 . . . 3) and the transitions Tis (i=0 . . . 3; s=0 . . . 3) between these states are shown in table 1 below and in the diagram in FIG. 5.

For implementation of this method for controlling a polyphase synchronous rotary electrical machine 1, the electronic control unit 7 of the control device 12 according to the invention, which is formed by a microprocessor, a microcontroller or any other microprogrammable component, thus comprises, in addition to a peripheral 8 for generation of PWM signals, means 26 for acquisition of the speed of rotation Ω and means for comparison of this speed of rotation Ω with a predetermined nominal speed of rotation Ω0.

Above this nominal speed of rotation Ω0 of approximately 300 to 400 Hz, the central processing unit 9 of the microprocessor 7 executes a first subroutine making it possible to emulate a full-wave control C on the PWM peripheral 8, such as to remain compatible with the switching performance of the inverter 3.

This first subroutine comprises instructions which are representative of the above-described algorithm, and in particular of the states machine represented in FIG. 5 and specified in table 1.

These instructions are stored in a memory 10 of the microprocessor 7. They comprise instructions for loading programming registers of the duty cycle and alignment of the PWM signal.

A second subroutine, the code of which is also stored in the memory 10 of the microprocessor 7, is executed when the speed of rotation Ω of the electrical machine 1 is lower than the nominal speed of rotation Ω0.

This second subroutine allows the PWM peripheral 8 to generate a PWM control at a frequency F of a few KHz in order to control the inverter 3 in a manner which in itself is known.

In a particular embodiment, the control device 12 according to the invention comprising the inverter 3 and the electronic control unit 7 is integrated on the rear bearing of a reversible electrical machine 1 for a motor vehicle.

This is a modern reversible electrical machine 1 which communicates with the motor control unit of the vehicle via an interface 27 for a land network, for example of the LIN or CAN type or the like, integrated in the microprocessor 7.

TABLE 1

| Input | | Output | Input | | Output |
|---|---|---|---|---|---|
| T11 | $\theta(t_{n+1}) - S1 < 0$ | α = 0 | T03 | Not(T22)&Not(T11) | α = 0 |
| T22 | $\theta(t_{n+1}) - S2 < 0$ | α = 1 | T32 | Not(T33)&Not(T11) | α = $(\theta(t_{n+1}) - S1).F/\omega(t_n)$ |
| T33 | $\theta(t_{n+1}) - \theta(t_n) > 0$ | α = 0 | T12 | Not(T11) | α = $(\theta(t_{n+1}) - S1).F/\omega(t_n)$ |
| T01 | T11 | α = 0 | T23 | Not(T22) | α = $1 - (\theta(t_{n+1}) - S2).F/\omega(t_n)$ |
| T02 | T22&Not(T11) | α = 1 | T31 | Not(T33)&T11 | α = 0 |

The choice of alignment of the PWM signal to the left or to the right depends only on the first or second angular switching threshold crossed by the electrical position θ (S1 or S2): if it is S1 there is alignment to the right 25, and if it is S2 there is alignment to the left 24. If it is neither one nor the other, this is not important since the duty cycle α is 0 or 1.

This algorithm is limited by the temporal resolution of the electrical position θ: two successive electrical positions $\theta(t_{n+1})$, $\theta(t_n)$ must not be spaced by more than the width of the opening of the control S2-S1 in order not to have to generate two fronts in the same PWM period. Typically, for a control of the "all or nothing" type, it is necessary to have at least two position points in an electrical period (180°).

Because of the implementation of a microprocessor 7, the control device 12 can adapt easily to various electrical characteristics of the rotary electrical machine 1 simply by changing its microprogrammes, unlike a control device which is based on an ASIC for example, or any other wired logic component.

In addition, thanks to the method according to the invention, which, for high speeds of rotation Ω makes it possible to emulate a full-wave control C with the same architecture 8, 9, 10 as that used for a PWM control, the semiconductor switching elements 5, 6 of the inverter 3 do not need to have a high switching frequency Fc, and it is not necessary to provide another peripheral dedicated to the generation of a full-wave control.

This results in a reduction of the costs, thus providing the reversible electrical machine according to the invention with a certain competitive advantage.

It will be appreciated that the invention is not limited simply to the preferred embodiments previously described.

The time diagrams of the phase voltages U1, V1, W1; U2, V2, W2 are provided simply by way of example for a three-phase machine; similar time diagrams could illustrate a description relating to a machine with a larger number of phases, and in particular double three-phase.

The numerical values of the nominal speed of rotation Ω0 and of the signal frequency F are provided for a type of reversible electrical machine already sold by the applicant company, which the method and the device according to the invention are intended to improve.

Other numerical values are predetermined according to the electro-mechanical characteristics of other types or models.

The invention thus incorporates all the possible variant embodiments which would remain within the context defined by the following claims.

The invention claimed is:

1. A method for controlling a polyphase synchronous rotary electrical machine (1), said method comprising a step of controlling phase currents of said electrical machine (1) by a full-wave control (C),
    wherein said full-wave control (C, C2, C1) is generated by a pulse width modulated (PWM) signal (16) with a signal frequency (F) higher than an electrical frequency of said electrical machine,
    wherein rising or descending fronts (24, 25) of said pulse width modulated signal (16) are synchronised with first and second crossings of first and second angular switching thresholds (S1, S2) by an electrical position (θ) of said machine (1), and
    wherein a duty cycle (α) of said pulse width modulated signal (16) is refreshed periodically to said signal frequency (F).

2. A method for controlling a polyphase synchronous rotary electrical machine (1), said method comprising a step of controlling phase currents of said electrical machine (1) by a full-wave control (C),
    wherein said full-wave control (C, C2, C1) is generated by a pulse width modulated (PWM) signal (16) with a signal frequency (F) higher than an electrical frequency of said electrical machine,
    wherein rising or descending fronts (24, 25) of said pulse width modulated signal (16) are synchronised with first and second crossings of first and second angular switching thresholds (S1, S2) by an electrical position (θ) of said machine (1),
    wherein a duty cycle (α) of said pulse width modulated signal (16) is refreshed periodically to said signal frequency (F),
    wherein, with said electrical position (θ) being evaluated periodically at said signal frequency (F) and a current position of said electrical position (θ) being determined at a first instant, a future position of said electrical position (θ) at a second instant, consecutive to said first instant, is estimated to be equal to said current position augmented by the quotient of an electrical speed of said machine (1) at said first instant by said signal frequency (F), and
    wherein said duty cycle (α) is refreshed to said first instant according to said future position and said first and second angular switching thresholds (S1, S2).

3. The method according to claim 2, wherein, with said first angular switching threshold (S1) being lower than said second angular switching threshold (S2), refreshing of said duty cycle (α) at said first instant fulfils one of the following conditions:
    said duty cycle (α) is zero when said future position is lower than modulus 360° at said first angular switching threshold (S1);
    said duty cycle (α) is equal to a unit when said future position is lower than said second angular switching threshold (S2) and the current position is higher than the first angular switching threshold (S1);
    said duty cycle (α) at said first crossing is given by a first expression:

$$\alpha=(\theta(t_{n+1})-S1)\cdot F/\Omega(t_n),$$

where:
    $\theta(t_{n+1})$ is said future position;
    S1 is said first angular switching threshold;
    $\Omega(t_n)$ is said electrical speed at said first instant;
    F is said signal frequency; and
    said duty cycle (α) at said second crossing is given by a second expression:

$$\alpha=1-(\theta(t_{n+1})-S2)\cdot F/\Omega/(t_n),$$

where:
    $\theta(t_{n+1})$ is said future position;
    S2 is said second angular switching threshold;
    $\Omega(t_n)$ is said electrical speed at said first instant;
    F is said signal frequency.

4. The method according to claim 3, wherein said pulse width modulation signal (16) is aligned to the right (25) of said first crossing and aligned to the left (24) of said second crossing.

5. A method for controlling a polyphase synchronous rotary electrical machine (1), said method comprising a step of controlling phase currents of said electrical machine (1) by a full-wave control (C),
    wherein said full-wave control (C, C2, C1) is generated by a pulse width modulated (PWM) signal (16) with a signal frequency (F) higher than an electrical frequency of said electrical machine,
    wherein rising or descending fronts (24, 25) of said pulse width modulated signal (16) are synchronised with first and second crossings of first and second angular switching thresholds (S1, S2) by an electrical position (θ) of said machine (1),
    wherein a duty cycle (α) of said pulse width modulated signal (16) is refreshed periodically to said signal frequency (F),
    wherein said full-wave control (C, C1, C2) is a first control (17, 18) or a second control (19, 20, 21) different from said first control (17,18), and wherein said first and second angular switching thresholds (S1, S2) are respectively 0° and 180° for said first control (17, 18), or 30° and 150° for said second control (19, 20, 21).

6. The method according to claim 1, further comprising the step of controlling said phase currents directly by said pulse width modulated (PWM) signal (16) when said electrical frequency is lower than a predetermined nominal electrical frequency.

7. A control device (12) of a polyphase synchronous rotary electrical machine (1) adapted to implement a method for controlling a polyphase synchronous rotary electrical machine (1), said method comprising a step of controlling phase currents of said electrical machine (1) by a full-wave control (C, C2, C1) generated by a pulse width modulated (PWM) signal (16) with a signal frequency (F) higher than an electrical frequency of said electrical machine, said control device (12) comprising an electronic control unit (7) controlling an inverter (3) connected to an on-board electrical network (2) supplied by a battery (B+), and configured to be connected to phase windings (u, v, w) of said polyphase synchronous rotary electrical machine (1), said electronic control unit (7) comprising:

- acquisition means (26) for acquisition of a speed of rotation (S2) of said polyphase synchronous rotary electrical machine (1);
- a peripheral (8) for generation of pulse width modulated signals at a predetermined signal frequency (F) comprising at least one programming register of a duty cycle ($\alpha$) and alignment (24, 25) of said pulse width modulated signal (16);
- means for comparison of said speed of rotation (S2) with a predetermined nominal speed of rotation;
- a central processing unit (9) executing a first subroutine or a second subroutine periodically charging said programming register in order to generate said pulse width modulated signals (16) to control said inverter such as to produce first, pulse width modulated phase voltages (U1, V1, W1) or second, full-wave phase voltages (U2, V2, W2) according to a state of said means for comparison;
- a memory (10) for storing said first and second subroutines.

8. The control device (12) according to claim 7, wherein said signal frequency (F) is lower than a predetermined maximum switching frequency of said inverter (3), and wherein said nominal speed of rotation corresponds to a nominal electrical frequency lower by an order of magnitude than said signal frequency (F).

9. A reversible electrical machine (1) for a motor vehicle, comprising a control device (12) according to claim 7.

10. The method according to claim 2, wherein said full-wave control (C, C1, C2) is a first control (17, 18), or a second control (19, 20, 21) different from said first control (17,18), and wherein said first and second angular switching thresholds (S1, S2) are respectively 0° and 180° for said first control (17, 18), or 30° and 150° for said second control (19, 20, 21).

11. The method according to claim 3, wherein said full-wave control (C, C1, C2) is a first control (17, 18), or a second control (19, 20, 21) different from said first control (17,18), and wherein said first and second angular switching thresholds (S1, S2) are respectively 0° and 180° for said first control (17, 18), or 30° and 150° for said second control (19, 20, 21).

12. The method according to claim 4, wherein said full-wave control (C, C1, C2) is a first control (17, 18), or a second control (19, 20, 21) different from said first control (17,18), and wherein said first and second angular switching thresholds (S1, S2) are respectively 0° and 180° for said first control (17, 18), or 30° and 150° for said second control (19, 20, 21).

13. The method according to claim 2, further comprising the step of controlling said phase currents directly by said pulse width modulated (PWM) signal when said electrical frequency is lower than a predetermined nominal electrical frequency.

14. The method according to claim 3, further comprising the step of controlling said phase currents directly by said pulse width modulated (PWM) signal when said electrical frequency is lower than a predetermined nominal electrical frequency.

15. The method according to claim 4, further comprising the step of controlling said phase currents directly by said pulse width modulated (PWM) signal when said electrical frequency is lower than a predetermined nominal electrical frequency.

16. The method according to claim 5, further comprising the step of controlling said phase currents directly by said pulse width modulated (PWM) signal when said electrical frequency is lower than a predetermined nominal electrical frequency.

* * * * *